UNITED STATES PATENT OFFICE.

WILLIAM D. HALL, OF HAMDEN, CONNECTICUT, ASSIGNOR TO QUINNIPIAC COMPANY, OF SAME PLACE.

IMPROVEMENT IN FERTILIZERS.

Specification forming part of Letters Patent No. 26,548, dated December 20, 1859.

*To all whom it may concern:*

Be it known that I, WILLIAM D. HALL, of the town of Hamden, in the county of New Haven and State of Connecticut, have invented a new and useful Improvement in Preparing Concentrated Artificial Manure; and I do hereby declare that the following is a full, clear, and exact description of the process by which it is prepared.

My improvement consists in the process of boiling fish in common fresh water, and, after the principal part of the water has been drained off, sprinkling a small quantity of sulphuric acid upon the boiled fish and mixing it thoroughly, so that the acid, assisted by the remaining moisture in the fish, will pervade the whole and cause it to become one homogeneous mass, which will only need drying by solar or artificial heat to render it fit to be applied to the land as a fertilizer.

I boil the fish by steam in wooden tanks, vats, or tubs until the fish is thoroughly cooked, when the organic substance, whether in fragments or whole fish, will sink to or remain at the bottom of the vessel, when the oil may be skimmed or drawn off, if desired, without any reference to the manufacture of the oil. I then take the fish from the tank and let the mass drain until most of the water is drained from it. I then sprinkle upon the mass a quantity of sulphuric acid, varying (on account of the weather or state of the substance, as where putrefaction has commenced more antiseptic action will be [required]) from one to three per cent. of the weight of the animal substance, the medium being about two per cent., and mix it thoroughly, so that the animal matter and acid may become one homogeneous mass. I then spread this homogeneous mass on a platform and dry it by solar or artificial heat, (but the former is preferred,) when the mass may be packed up as ready to be applied to the land as a fertilizer in the same manner as Peruvian guano.

If found more convenient in any case, the fish may be cooked in metallic boilers, as there is no acid or other substance used in boiling which will injure a metallic boiler, as is the case in both Dr. Hare's patented process and in Mr. Halliday's described process. Also, nitric or muriatic acid may be used, if thought best; but they are more costly and no better than sulphuric acid, which is the most convenient.

The advantages of my improved process over every former process consist, in part, in that I boil the fish in common fresh water without using any acid or sulphates, &c., as is used by Dr. Hare's, nor acid, nor salt-water, nor chloride of sodium, (common salt,) as used by Mr. Halliday, (I can therefore use metallic boilers to cook the fish in, if found more convenient in any case, and I do not waste the acid by evaporation;) and in that I do not use but a small portion of the acid as compared with Dr. Hare's process, about two to fifteen, as he uses from a fifth to a tenth of the weight of the animal matter—medium fifteen per cent.— and, as compared with Mr. Halliday's process, about two to six; and I do not use any of the neutral salts which are used by Dr. Hare, nor natural nor artificial salt-water, as used by Mr. Halliday; and in that I do not mix any of the earthy or ligneous substances with the mass to serve as a divider, or to render it pulverulent, as this is not needed in my process, as the mass will dry without it, it having nothing of the character of gelatinous paste in it; and although it has long been known that most of the substances named are valuable fertilizers, especially bone-dust, bone black, ground plaster, powdered charcoal, coal-tar, petroleum, wood-tar, pitch, resin, lime, and ground limestone, yet all these substances may be obtained and used without reference to any patent; and in that I do not need to press the mass, as is done by Mr. Halliday, nor to grind the substance, as is necessary in both Dr. Hare's and Mr. Halliday's processes, as by my own process it is ready for use as soon as it is dry. Thus my process is much more convenient, much less expensive, and much better, as the user is not required to buy and transport earthy and ligneous substances when he may have them at home in abundance.

I am aware that artificial manure has been prepared from fish and flesh by boiling the animal substance with sulphuric acid in such a manner as to form a gelatinous mass, which was afterward rendered pulverulent by the addition of earthy or ligneous substances, as described in Dr. Hare's patent, issued January 29, 1850, and also that it has been prepared from fish by boiling them with acid and natural or artificial salt-water, pressing them, and adding ground earthy materials to serve as a divider of the mass, as described by S. B. Halliday in his application, which was rejected August 3, 1855.

I therefore do not claim either of these as my invention, as I do not need or use either of them in my process; but

What I claim as my invention, and desire to secure by Letters Patent, is—

Preparing concentrated artificial manure by boiling fish in common fresh water until the whole is thoroughly cooked, then removing it from the vessel, and, when sufficiently drained, sprinkling on it from one to three per cent., (usually about two per cent.,) by weight, of sulphuric acid, mixing thoroughly, and drying by solar or artificial heat, when the whole is effected substantially in the manner and by the process herein described.

WM. D. HALL.

Witnesses:
SAML. NOYES,
R. FITZGERALD.